US009262740B1

(12) United States Patent
Brown et al.

(10) Patent No.: US 9,262,740 B1
(45) Date of Patent: Feb. 16, 2016

(54) METHOD FOR MONITORING A PLURALITY OF TAGGED ASSETS ON AN OFFSHORE ASSET

(71) Applicant: UTEC SURVEY, INC., Houston, TX (US)

(72) Inventors: Douglas John Brown, Livingston (GB); Gregory Hammond, Livingston (GB); David Patrick Cahill, Livingston (GB)

(73) Assignee: UTEC SURVEY, INC., Houston, TX (US)

( * ) Notice: Subject to any disclaimer, the term of this patent is extended or adjusted under 35 U.S.C. 154(b) by 0 days.

(21) Appl. No.: 14/601,483

(22) Filed: Jan. 21, 2015

Related U.S. Application Data

(60) Provisional application No. 61/929,798, filed on Jan. 21, 2014.

(51) Int. Cl.
| | |
|---|---|
| *G06Q 10/00* | (2012.01) |
| *G06T 15/00* | (2011.01) |
| *G06Q 10/08* | (2012.01) |
| *G06F 17/30* | (2006.01) |
| *G06F 3/0481* | (2013.01) |
| *G06F 3/0484* | (2013.01) |
| *G06F 3/0488* | (2013.01) |

(52) U.S. Cl.
CPC .......... *G06Q 10/087* (2013.01); *G06F 3/04817* (2013.01); *G06F 3/04842* (2013.01); *G06F 3/04886* (2013.01); *G06F 17/30268* (2013.01)

(58) Field of Classification Search
USPC ......................................................... 705/28
See application file for complete search history.

(56) References Cited

U.S. PATENT DOCUMENTS

| | | | | |
|---|---|---|---|---|
| 8,572,059 B2* | 10/2013 | Britton | .................. | G06F 19/345 707/705 |
| 9,031,585 B2* | 5/2015 | Kahle | .................... | G01C 15/00 340/686.5 |
| 2002/0008621 A1* | 1/2002 | Barritz | ...................... | G01S 5/00 340/572.1 |
| 2002/0032546 A1* | 3/2002 | Imamura | ............ | G06Q 30/0601 703/1 |
| 2002/0075307 A1* | 6/2002 | Alexander | .............. | H04L 29/06 715/760 |
| 2003/0000115 A1* | 1/2003 | Green | ..................... | E02F 3/435 37/348 |
| 2007/0219645 A1* | 9/2007 | Thomas | ................. | G05B 15/02 700/29 |
| 2008/0077512 A1* | 3/2008 | Grewal | .................. | G05B 19/05 705/28 |
| 2009/0048981 A1* | 2/2009 | McBain Millan | ..... | G06Q 40/06 705/36 R |
| 2009/0216438 A1* | 8/2009 | Shafer | .................. | G01C 21/206 701/414 |

(Continued)

*Primary Examiner* — Ashford S Hayles
(74) *Attorney, Agent, or Firm* — Buskop Law Group, PC; Wendy Buskop

(57) ABSTRACT

A method for monitoring a plurality of tagged assets on at least one offshore asset, by creating a customer profile and a library of survey set ups and storing information from independent survey set ups mounted on or proximate to the offshore asset on the administrative data storage. The method includes creating a library of tagged assets for the offshore asset using at least one independent survey set up, wherein each tagged asset has an icon with a hyperlink to a library of images. The method includes identifying placement locations on offshore assets and forming an executive dashboard for display on at least one client device, wherein a virtually positioned icon positioned on an image of the tagged assets presents a hyperlink to the library of survey set ups for that tagged asset, thereby enabling toggling from the image to the library of survey set ups.

20 Claims, 9 Drawing Sheets

(56) References Cited

U.S. PATENT DOCUMENTS

| | | | | |
|---|---|---|---|---|
| 2009/0225164 A1* | 9/2009 | Renkis | G08B 13/19656 | 348/143 |
| 2009/0292464 A1* | 11/2009 | Fuchs | G06Q 10/087 | 701/532 |
| 2009/0315978 A1* | 12/2009 | Wurmlin | G06T 5/005 | 348/43 |
| 2010/0177120 A1* | 7/2010 | Balfour | G06T 19/20 | 345/647 |
| 2010/0329542 A1* | 12/2010 | Ramalingam | G01C 21/3602 | 382/154 |
| 2011/0029897 A1* | 2/2011 | Russell | G05B 15/02 | 715/757 |
| 2011/0176179 A1* | 7/2011 | Judelson | G06T 19/00 | 358/448 |
| 2011/0298619 A1* | 12/2011 | O'Hare | A01K 11/008 | 340/573.1 |
| 2012/0019522 A1* | 1/2012 | Lawrence | F41G 3/02 | 345/419 |
| 2012/0046978 A1* | 2/2012 | Cartwright | G06Q 10/063 | 705/7.11 |
| 2012/0256917 A1* | 10/2012 | Lieberman | G06T 17/05 | 345/419 |
| 2013/0072223 A1* | 3/2013 | Berenberg | H04W 4/02 | 455/456.1 |
| 2013/0091452 A1* | 4/2013 | Sorden | G06F 3/048 | 715/771 |
| 2013/0141428 A1* | 6/2013 | Gipson | G06T 19/003 | 345/419 |
| 2013/0218890 A1* | 8/2013 | Fernandes | G06Q 50/163 | 707/736 |
| 2013/0253968 A1* | 9/2013 | Martinez | G06Q 50/08 | 705/7.12 |
| 2013/0282345 A1* | 10/2013 | McCulloch | G06T 19/006 | 703/6 |
| 2013/0341093 A1* | 12/2013 | Jardine | E21B 7/00 | 175/40 |
| 2014/0125651 A1* | 5/2014 | Sharp | G06T 15/04 | 345/419 |
| 2014/0125770 A1* | 5/2014 | Bell | H04N 13/0203 | 348/46 |

* cited by examiner

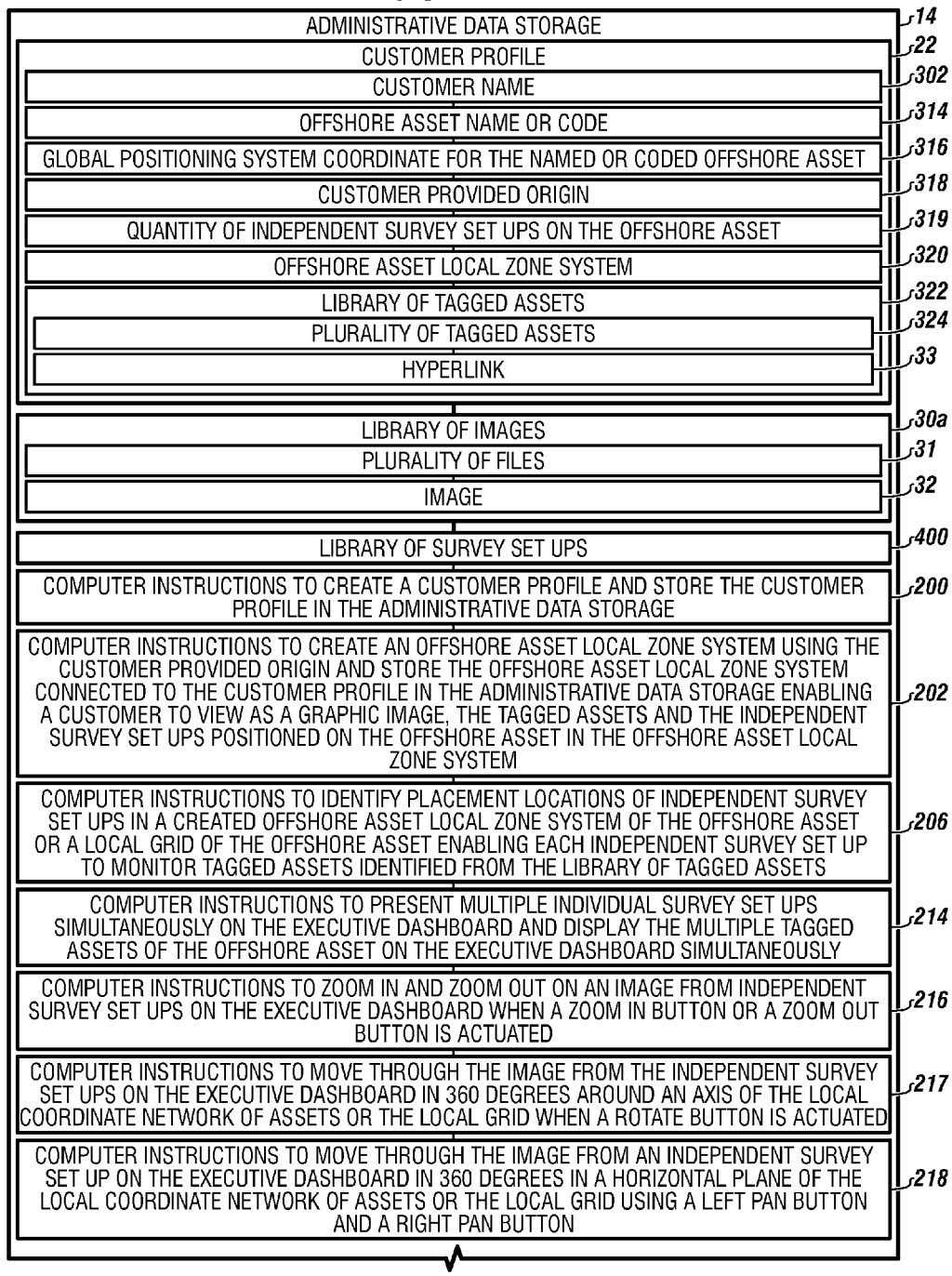

FIGURE 2B

- 14
- 219 COMPUTER INSTRUCTIONS TO MOVE THROUGH THE IMAGE FROM AN INDEPENDENT SURVEY SET UP ON THE EXECUTIVE DASHBOARD IN 360 DEGREES IN A VERTICAL PLANE OF THE OFFSHORE ASSET LOCAL COORDINATE NETWORK OF ASSETS OR THE LOCAL GRID USING AN UP BUTTON AND A DOWN BUTTON
- 220 COMPUTER INSTRUCTIONS FOR INSTALLING SHOW HIDE ICONS ONTO AN IMAGE FROM AN INDEPENDENT SURVEY SETUP ON THE EXECUTIVE DASHBOARD WHEN A SHOW HIDE BUTTON IS ACTUATED
- 222 COMPUTER INSTRUCTIONS TO ADD AND DELETE A TAGGED ASSET TO THE LIBRARY OF TAGGED ASSETS USING A CLIENT DEVICE USING A DIALOG SCREEN TO INSERT OR DELETE: AN ASSET NAME, AN ASSET GEOLOCATION, AND ASSET SPECIFICATIONS WHEN AN ADD OR DELETE BUTTON IS ACTUATED
- 224 COMPUTER INSTRUCTIONS TO SEARCH FOR A TAGGED ASSET FROM THE LIBRARY OF TAGGED ASSETS USING AN ASSET NAME OR AN ASSET GEOLOCATION AND PRESENT THE RESULTS OF THE SEARCH ON THE EXECUTIVE DASHBOARD
- 226 COMPUTER INSTRUCTIONS TO ADD A COMPASS TO IMAGES FROM THE LIBRARY OF TAGGED ASSETS FOR DISPLAY ON THE EXECUTIVE DASHBOARD WHILE DEPICTING THE LOCAL COORDINATE NETWORK OF ASSETS OR THE LOCAL GRID, WHEREIN THE COMPASS IS ALIGNED TO A TRUE NORTH RELATIVE TO THE TAGGED ASSET ON THE PLANET
- 228 COMPUTER INSTRUCTIONS TO PRESENT A LASER ANALYSIS BUTTON ON THE EXECUTIVE DASHBOARD CONNECTED TO LASER ANALYSIS SOFTWARE IN THE ADMINISTRATIVE DATA STORAGE
- 230 LASER ANALYSIS SOFTWARE
- 232 COMPUTER INSTRUCTIONS TO ENABLE A USER ON A CLIENT DEVICE TO TOGGLE BETWEEN A FULL SCREEN AND A REDUCED SCREEN VIEW OF A TAGGED ASSET, WHEN A FULL SCREEN/REDUCED SCREEN TOGGLE BUTTON IS ACTUATED ON THE EXECUTIVE DASHBOARD
- 236 COMPUTER INSTRUCTIONS TO ENABLE A USER TO TOGGLE BETWEEN A FULL COLOR IMAGE FROM AN INDEPENDENT SURVEY SETUP AND A MONOCHROME IMAGE FROM AN INDEPENDENT SURVEY SET UP WHEN A COLOR/MONOCHROME TOGGLE BUTTON IS ACTUATED
- 240 COMPUTER INSTRUCTIONS THAT SUPPLIES LOCATION INFORMATION FROM A LOCAL COORDINATE NETWORK OF ASSETS OR THE LOCAL GRID OF TAGGED ASSETS AND IDENTIFIES AT LEAST ONE GEOGRAPHICALLY PROXIMATE INDEPENDENT SURVEY SET UP LOCATION IN THE LOCAL COORDINATE NETWORK OF ASSETS OR LOCAL GRID WHEN AN INFORMATION BUTTON IS ACTUATED ON THE EXECUTIVE DASHBOARD
- 244 COMPUTER INSTRUCTIONS TO DISPLAY A MAP OF THE LOCAL COORDINATE NETWORK OF ASSETS OR THE LOCAL GRID WHILE SIMULTANEOUSLY VIEWING IMAGES FROM THE INDEPENDENT SURVEY SET UP WHEN A TAB ON THE EXECUTIVE DASHBOARD IS ACTIVATED
- 245 COMPUTER INSTRUCTIONS TO CREATE A PLAN VIEW OF ALL OR A PORTION OF THE INDEPENDENT SURVEY SET UPS FROM THE LIBRARY OF SURVEY SET UPS ON THE EXECUTIVE DASHBOARD
- 246 COMPUTER INSTRUCTIONS FOR INDICATING A DIRECTION OF A FIELD OF REFERENCE RELATIVE TO A NORTH OF THE OFFSHORE ASSET ON THE PLAN VIEW IN THE OFFSHORE ASSET LOCAL ZONE SYSTEM OR THE LOCAL GRID FROM AN INDEPENDENT SURVEY SET UP USING A FIELD OF VIEW REFERENCE POINTER IN THE PLAN VIEW CREATED WHEN A TAB IS ACTUATED ON THE EXECUTIVE DASHBOARD

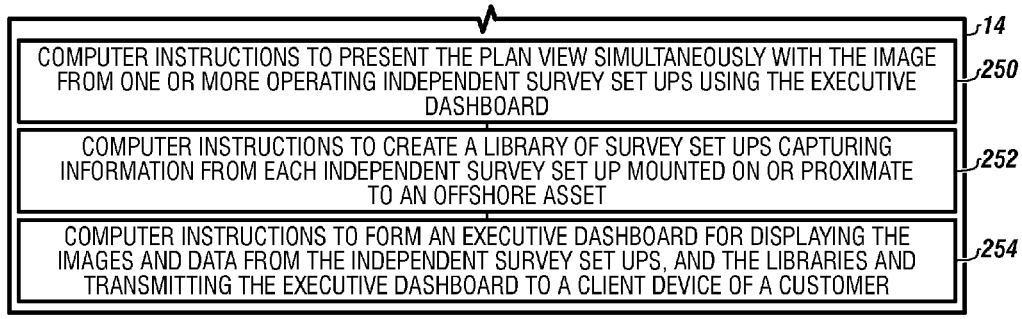

FIGURE 4

| | |
|---|---|
| ADMINISTRATIVE DATA STORAGE | 14 |
| LIBRARY OF SURVEY SET UPS | 400 |
| INDEPENDENT SURVEY SET UP IDENTIFIERS | 402 |
| INDEPENDENT SURVEY SET UP DATA CAPTURE DEVICE CODES | 404 |
| TRANSMISSION CONNECTION DESCRIPTIONS | 406 |
| INFORMATION ON A TIME LINE OF THE DATA CAPTURE DEVICE | 408 |
| CUSTOMER NAME | 302 |
| OFFSHORE ASSET NAME OR CODE | 314 |
| AN ADDRESS OF THE INDEPENDENT SURVEY SET UP IN THE OFFSHORE ASSET LOCAL ZONE SYSTEM OR THE LOCAL GRID | 420 |
| AT LEAST ONE OF A LIVE VIDEO FEED, A STORED VIDEO FEED, STILL PHOTOS OF THE TAGGED ASSET, AND SONAR OF THE TAGGED ASSET | 422 |
| LASER INFORMATION ON LASERS USED IN INDEPENDENT SURVEY SET UPS | 424 |
| AT LEAST TWO AND POSSIBLY THREE X, Y, AND Z COORDINATES LOCATING THE INDEPENDENT SURVEY SET UP IN THE OFFSHORE ASSET LOCAL ZONE SYSTEM OR THE LOCAL GRID | 426 |
| SOURCES OF POWER SUPPLY FOR EACH INDEPENDENT SURVEY SET UP ON THE OFFSHORE ASSET | 428 |
| JOB PROJECT NAME | 430 |
| EQUIPMENT SPECIFICATIONS ON DATA CAPTURE DEVICES USED IN INDEPENDENT SURVEY SET UPS | 432 |
| SEMI-TEMPORARY TARGETS IDENTIFIED FOR ESTABLISHING THE LOCATION OF THE TAGGED ASSET IN THE OFFSHORE ASSET LOCAL ZONE SYSTEM OR THE LOCAL GRID | 434 |
| SUPPORT DEVICE INFORMATION ON EQUIPMENT USED TO SUPPORT THE DATA CAPTURE DEVICE | 436 |
| DISTANCE THE INDEPENDENT SURVEY SET UP IS FROM THE OFFSHORE ASSET | 438 |

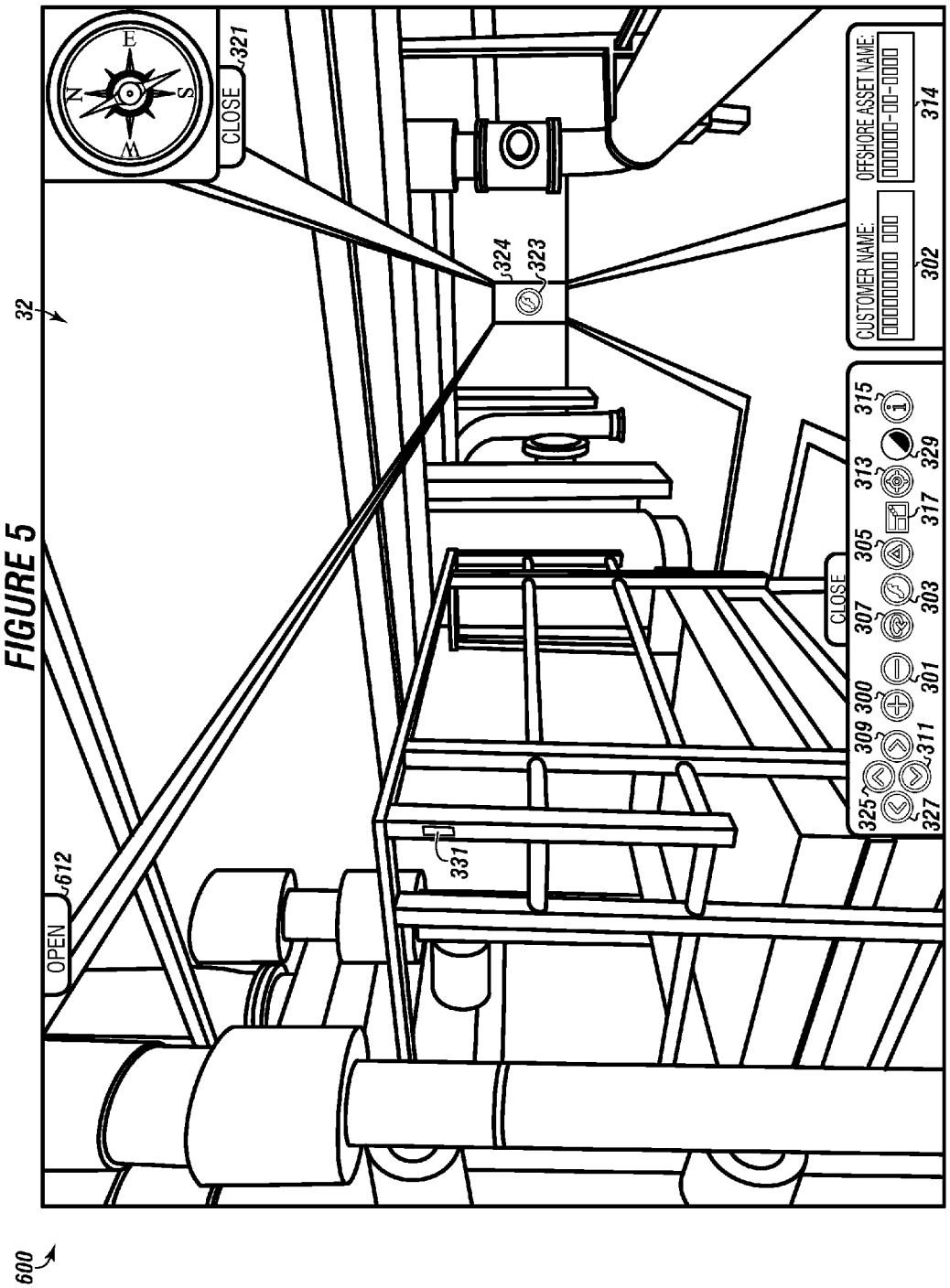

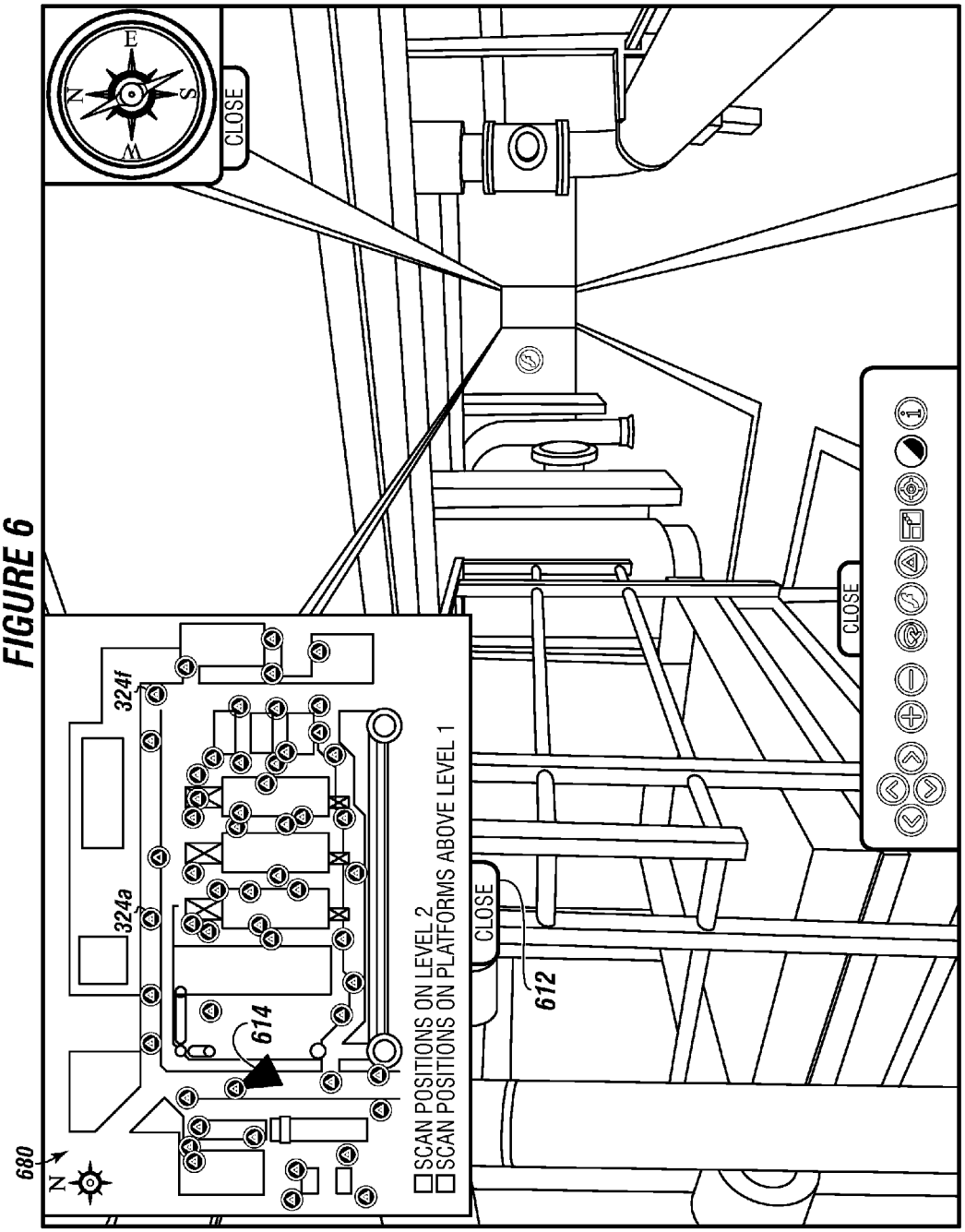

(7A)

| CREATING AN ICON CONNECTED TO THE LIBRARY OF TAGGED ASSETS AND INSTALLING THE ICON VIRTUALLY OVER THE IMAGE OF THE TAGGED ASSET GENERATED FROM THE DATA CAPTURE DEVICE, WHICH CAN ALSO INCLUDE CREATING A HYPERLINK FOR THE ICON TO THE LIBRARY OF IMAGES AND THE CUSTOMER PROFILE IN THE ADMINISTRATIVE DATA STORAGE | 821 |
|---|---|
| USING COMPUTER INSTRUCTIONS AND THE EXECUTIVE DASHBOARD TO ACCESS AND VIEW RELATED DATA OF THE OFFSHORE ASSETS SUCH AS SPECIFICATION DATA, WHILE VIEWING THE DATA CAPTURE IMAGES AND THE PLAN VIEW SIMULTANEOUSLY FROM A PLURALITY OF CLIENT DEVICES OF THE CUSTOMER, SIMULTANEOUSLY | 824 |

FIGURE 7B

METHOD FOR MONITORING A PLURALITY OF TAGGED ASSETS ON AN OFFSHORE ASSET

CROSS REFERENCE TO RELATED APPLICATIONS

The current application claims priority to and the benefit of U.S. Provisional Patent Application Ser. No. 61/929,798 filed on Jan. 21, 2014, entitled "METHOD FOR MONITORING A PLURALITY OF TAGGED ASSETS ON AN OFFSHORE ASSET." This reference is hereby incorporated in its entirety.

FIELD

The present embodiments generally relate to a method for monitoring a plurality of tagged assets on at least one offshore asset.

BACKGROUND

A need exists for a method of monitoring for specific assets on an offshore asset which can use laser scanning, video collection, and other tools, including sonar in real time, and can present the images and related data to a user with a client device that is remote from the offshore asset or on the offshore asset.

The present embodiments meet these needs.

BRIEF DESCRIPTION OF THE DRAWINGS

The detailed description will be better understood in conjunction with the accompanying drawings as follows:

FIGS. 2A-2C depict an administrative data storage usable with the method.

FIG. 3 depicts a customer profile usable with the method.

FIG. 4 depicts the fields used to create a library of survey set ups usable with the method.

FIG. 5 depicts a display of an executive dashboard produced by this method.

FIG. 6 depicts a plan view of locations of survey set ups produced by this method.

FIGS. 7A-7B depict a sequence of steps to implement the method according to one or more embodiments.

Figure 1:
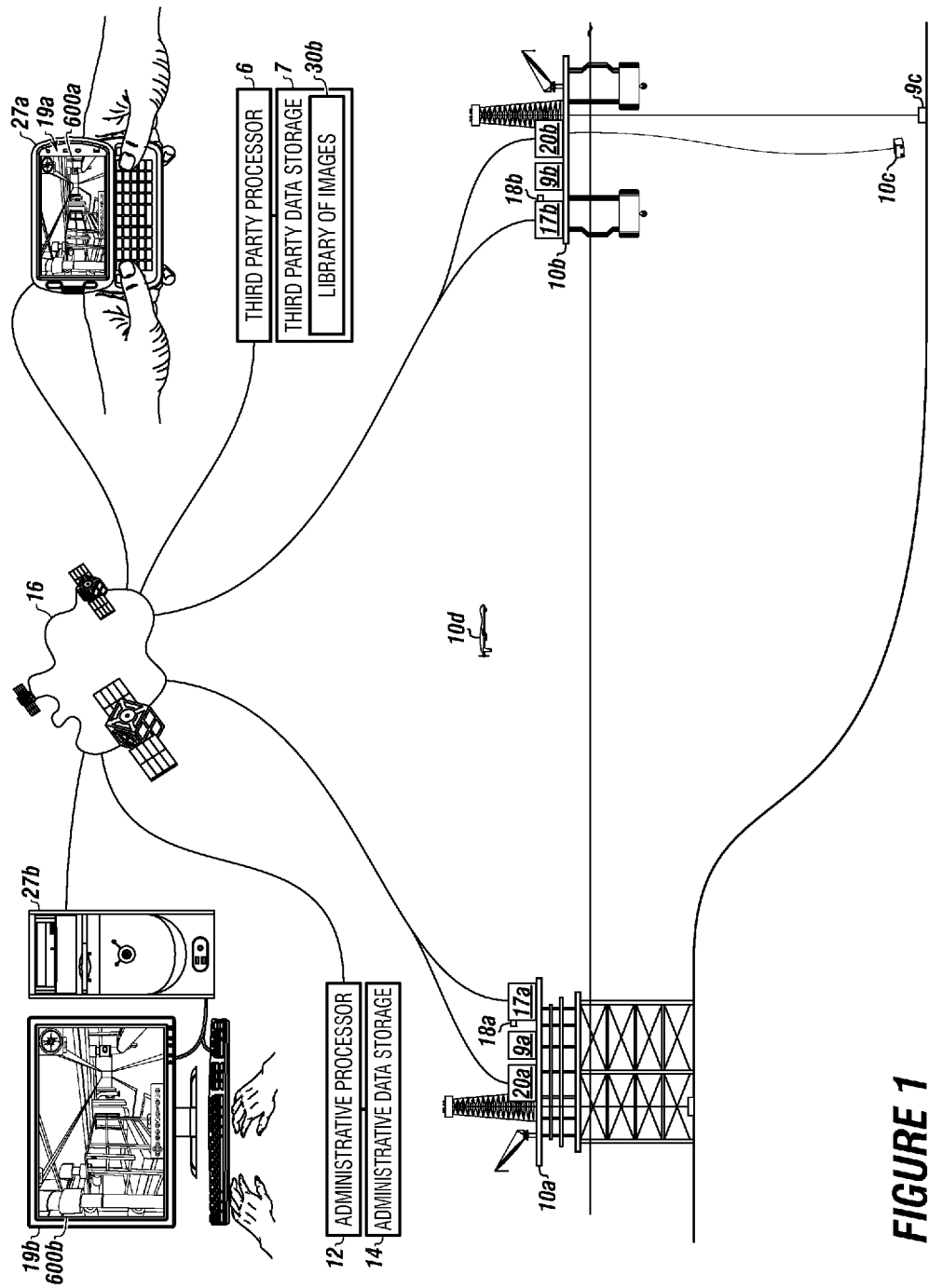
FIG. 1 depicts a diagram of equipment usable with the method.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method for monitoring a plurality of tagged assets on at least one offshore asset.

The method can create a customer profile and then a library of tagged assets and a library of survey set ups, wherein each independent survey set up can be mounted on or proximate to the offshore asset.

For each tagged asset the method can create an icon with a hyperlink to a library of images stored on the administrative data storage.

The method identifies placement locations for each independent survey set up on an offshore asset and forms an executive dashboard for display on a client device of information from the independent survey set ups.

The executive dashboard can display a virtually positioned icon positioned on an image of a tagged asset. The icon can have a hyperlink to the library of survey set ups for that tagged asset, enabling a customer to toggle from the image to the library of survey set ups for viewing different information, such as a live video feed.

The method uses a networked administrative processor and data storage, and independent survey set ups directed to a tagged asset of an offshore asset.

The method uses a global positioning system differential receiver/transmitter or a local grid to create an x/y geolocation system with additional z axis for the offshore asset.

The method can create a customer profile, and a library of tagged assets connected to an icon with a hyperlink that is further connected to a library of images of the tagged assets on the offshore structure.

The method uses each independent survey set up mounted on or proximate to the offshore asset.

The method can form an executive dashboard for receiving images and information from (i) each independent survey set up and (ii) the library of survey set ups. The executive dashboard displays a customer name and/or offshore asset identifier on an image of the tagged asset on the offshore asset. The method can show the icon virtually positioned on the tagged asset, enabling a customer using the executive dashboard to toggle from the image to the library of survey set ups.

The method helps prevent the death of a worker by providing status of the offshore asset by means of providing a visual image of the work environment and contributing to a safe and effective workplace.

The method helps prevent injury by visualizing and identifying hazards to workers in advance of work being carried out on the offshore asset.

The method helps prevent injuries by visually identifying trip hazards and undertaking suitable risk assessments in advance of future work being carried out on the offshore asset.

The method helps prevent explosions and fires by identifying areas of highest risk ahead of any maintenance work being carried out.

The method helps prevent environmental harm by providing early detection of exigent hazards that can lead to an environmental disaster.

The following definitions are used herein:

The term "administrative processor" as used herein can refer to a computer, a laptop, a personal digital assistant, a cellular telephone, a tablet computer or similar device capable of processing digital data and presenting digital images. The term can include a plurality of computers connected together, such as cloud computing processing.

The term "administrative data storage" as used herein can refer to a hard drive, cloud based data storage devices connected in parallel or in series, a jump drive, a portable hard drive or combinations thereof.

The term "data capture devices" as used herein can refer to cameras that record video images or sensors that detect temperature and pressure. Data capture devices can include underwater cameras, which can be video or still, and/or laser survey instruments. Data capture devices can include portable laser scanners that can be hand held. Data capture device can be positioned topside and underwater. Data capture devices can include sonar devices. Data capture devices can be mounted to, tethered or untethered remotely operated vehicles (ROVs). Data capture devices can be mounted to unmanned aerial vehicles, such as drones or boats. Data capture device can be mounted to an autonomous underwater vehicle. Often the data capture devices can be mounted on tripods.

The term "client device" as used herein can refer to a laptop, a computer, a cellular phone, a digital personal assistant, a tablet computer, or various combinations thereof that can receive the images of multiple independent survey set ups on the display of the client device.

The term "customer profile" as used herein can refer to a customer name, a customer billing address, a survey date, a customer user identification, a customer password, a customer security question and an answer, offshore asset name or code, global positioning system coordinates for the named or coded offshore asset, asset address in the offshore asset local zone system, including a height above or below a water line, and asset specification. Each customer profile can have a library of tagged assets which can include specifications on the tagged assets. The library of tagged assets for each customer identifies each tagged asset on the offshore asset to be used in an offshore asset local zone system. The customer profile can include addresses and identifications of each independent survey set up. Each customer profile can have a link enabling a user to connect to the actual independent survey set ups via a network to view images remotely, such as on client devices like a laptop or a cellular telephone. Each link will enable a customer to view the tagged assets using each independent survey set up in real time, as well as view historic recorded images. Each customer profile can contain information downloaded from each independent survey set up processor and independent survey set up data storage on equipment specifications of the independent survey set up, maintenance records of the independent survey set ups as well as recorded images.

The term "customer provided origin" as used herein can refer to a customer identified "zero," such as a well location, or "well number 1" as a reference point on or proximate to the offshore asset which can be a drilling platform. The customer provided origin can include a "local grid" as the term is defined herein.

The term "global positioning system differential receiver/transmitter" as used herein can refer to a global positioning system device which identifies the location of the offshore asset on the planet with WGS-84 coordinates, which can be transformed to a local coordinate system with longitude and latitude coordinates or x, y coordinates. In embodiments, the global positioning system differential receiver/transmitter can be used to identify the location of each tagged asset on the planet and be used to identify each independent survey set up on the offshore asset.

The term "independent survey set ups" as used herein can refer to an assembly of connected equipment including a data capture device with a survey set up processor with bidirectional communication, connectable with a power supply, such as rechargeable batteries or vessel power, data storage connected to the survey set up data storage which provides temporary or portable memory storage of images from the data capture device as well as data including GPS coordinates, actual proximate equipment names, height from decks and ceiling, camera specifications including lenses, and age and model of cameras. Each independent survey set up in embodiments can communicate with another independent survey set up as well as a network to communicate with the administrative processor of the system. The independent survey set up can include information on mounting means, such as tripods, clamps, watertight underwater housings. In some embodiments, the independent survey set up can include additional lighting systems connected to the survey set up processor, the data capture device or combinations thereof. The survey set up processor can store in the survey set up data storage information on the lighting such as lumens, watts, and type of light, such as "flash halogen," strobe or steady LED (light emitting diode) lights. In some embodiments, which the independents survey set ups can be mounted outside on a semisubmersible or jack up platform, the survey set up data storage can include information on protective housings, and dates of repair or inspection of the housing or entire independent survey set up as well as maintenance information on the independent survey set up. The independent survey set up processor can be a computer or device similar to the administrative processor.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "library of tagged assets" as used herein can refer to a customer defined set of tagged assets on the specific offshore asset. Each customer profile can have a library of tagged assets. Tagged assets can be valves, meter, pumps, gauges, switches, and/or pipes or any other tagged asset on the offshore asset. In the library of tagged assets, each tagged asset can have a specification, which can include a manufacturing date of the tagged asset, a maintenance schedule or schedule of repairs or inspections, and known defects. Each tagged asset can have additional information related to start date and end dates of maintenances for tracking service to the tagged asset. In the library of tagged assets, each tagged asset can have an installation date. Each tagged asset can have a priority code, showing the importance of the tagged asset on the offshore asset. Some tagged assets can be critical to operation of a drilling rig and can have a high priority, other tagged assets, such as running the toilets of the crew accommodation, can have a lower priority. The library of tagged assets can be customized to particular user needs, and can include information such as manufacturing materials of tagged asset, color of the tagged asset, size, weight, and anticipated length of usable operation.

The term "library of images" as used herein can refer to images, drawings, figures, manufacturing information including dates of install, dates of manufacture, maintenance records and other text, which can include specifications on tagged assets which can be used on the offshore asset. The library of images can be digital, analog or video images. Sonar read outs can also be in the library of images for underwater assets in particular. CAD drawings can be in the library of images. 3D simulations can be in the library of images as well as animations.

The term "library of survey set ups" as used herein can include information that comes directly from or relates to one or a plurality of independent survey set ups: (i) equipment specifications on data capture devices used in independent survey set ups, such as a camera make, model, and specifications; (ii) an address of the independent survey set up in an offshore asset local zone system or a local grid; (iii) a live video feed, a stored video feed, or still photos of the tagged assets, and can include sonar; (iv) laser information on lasers used in independent survey set ups; (v) semi-temporary targets identified for establishing the location of the tagged asset in the offshore asset local zone system; (vi) at least two and possible three x, y and z coordinates locating the independent survey set up in the offshore asset local zone system; (vii)

support device information on equipment used to support the data capture device, such as a camera, a laser or both at a preferred height, an elevation above a mean water level, such as a tripod; (viii) a distance from the offshore asset; (ix) sources of power supply for each independent survey set up on the offshore asset, such as oil rig or vessel supplied power, batteries or a fuel cell; (x) an indication of how the digital transfer of data occurs from the independent survey set ups to the administrative data storage; (xi) survey set up identifiers; (xii) data capture device codes; (xiii) transmission connection descriptions; (xiii) information on a time line of the data capture device; (xiv) a job project name; (xv) a customer name or customer code; and (xvi) an offshore asset name or code.

The term "local grid" as used herein can refer to a customer defined location system developed for a specific offshore asset. The local grid identifies using a geolocation system for tagged assets specifically by at least one of: a height, an angle, or a distance to certain markers, monuments or identified positions indicated by the customer on the offshore asset. In embodiments, the method ties the independent survey set ups to the local grid system and then connects the grid to the network enabling independent survey set ups to be trackable along with tagged assets using a customer's local grid of the offshore asset.

The term "network" as used herein can refer to a cellular network, the internet, another global communication system, a local area network, a wide area network, a satellite network, or combinations thereof. The network can be a client's own private network or a third party cloud network.

As the term is used herein, "offshore assets" can refer to a fixed or floating vessel, or an underwater structure. The offshore asset can be a drilling rig, a semisubmersible platform, a tension leg platform, a floating production and storage vessel, a floating storage unit, a platform, or underwater equipment connected to the offshore asset, such as a remotely operated vehicle (ROV) viewing an open hole section of a subsea well or a manifold, or a plan pipeline.

The term "offshore asset local zone system" as used herein can refer to a local zone system created for identified assets on the offshore asset using a customer provided origin which can have a linear dimension. The offshore asset local zone system can be a survey of the entire structure or a portion of the structure.

The term "real time" as used herein can refer to the most recent captured data from a data set or from an independent survey set up. The invention allows multiple customers to view in real time simultaneously captured data from multiple data capture devices on the offshore asset. Real time refers to an ability to display the captured data 24 hours a day, 7 days a week, continuously.

The term "tagged asset" as used herein can refer to an underwater asset, such as a wellhead, a manifold, a pipeline, and ends of pipelines. An underwater tagged asset can be a jacket and a pipeline riser or similar underwater assets. The term "tagged asset" also can refer to above water assets, including but not limited to meters, pumps, gauges, and mechanical devices including pipes, and other structural elements on the offshore asset. A tagged asset can be a moored platform, moored boat, and/or a moored barge.

The term "hyperlink" as used herein can refer to data that the customer or user can directly follow either by clicking on or by hovering over using a mouse or other indicator, and which then can be followed automatically to another document in another data storage or in an electronic library at another location. A hyperlink can point to a whole document or to a specific element within a document.

The term "laser analysis software" as used herein can refer to commercially available software that can allow a customer using the executive dashboard to perform real time measurements of the tagged asset with the data capture device from the executive dashboard. Commercially available laser analysis software can be purchased from Leica Geosystems of the United Kingdom.

The embodiments relate to a method for monitoring tagged assets on offshore assets using a processor, data storage and network to connect to a plurality of client devices.

The method can use a plurality of independent survey set ups and computer instructions to form an offshore asset local zone system using a customer provided origin.

The method can create a library of tagged assets, use a library of images, and create a library of survey set ups of independent survey set ups, to survey the offshore asset.

The term "image" in as used with regard to the library of images refers to video images, still images, sonar images, infrared images, and combinations thereof.

The method can target customer identified tagged assets within the surveyed offshore asset for monitoring in real time and for monitoring from remote locations by one or more users of client devices connected to the network.

The method can use computer instructions in at least one of the data storages to instruct at least one of the processors to create an offshore asset local zone system, to place or move independent survey set ups to target tagged assets of the offshore asset or it can use a local grid already created on the offshore asset to place independent survey set ups directed at specific tagged assets.

The method can collect and transfer data from the independent survey set ups and form viewable images of the tagged assets, which can be seen on an executive dashboard. The viewable images can be presented on the executive dashboard with the local grid or the created local coordinate system.

Turning now to the Figures, FIG. 1 depicts equipment used by the method for monitoring a plurality of tagged assets 9a-9c associated with at least one offshore asset 10a-10d.

The plurality of tagged assets can be pumps, meters gauges, or other assets on the offshore asset, which can be generally fixed to the offshore asset in embodiments.

Offshore asset 10a is depicted as a drilling platform. Offshore asset 10b is shown as a floating vessel. Offshore asset 10c is shown as a remotely controlled vehicle looking at a tagged asset 9c, shown as a subsea well. Offshore asset 10d is shown as an unmanned aerial vehicle. Autonomous underwater vehicles can be one of the offshore assets.

In an embodiment, the method can be used to monitor tagged assets on one level of a drilling semisubmersible in the North Sea.

The equipment of the method can include an administrative processor 12 with administrative data storage 14. The administrative processor in embodiments can be a computer located remote from the offshore asset. The administrative processor can be a computer with a data storage which can be hard drives, supplemented portable data storage, or a jump drive.

The administrative processor 12 can be connected to a network 16 which can connect to the offshore asset. In embodiments, two or more networks can be used, such as a satellite network connecting to the oil rig and the internet connected to the administrative processor.

The method uses a plurality of independent survey set ups 17a and 17b with each independent survey set up having one or more data capture devices 18a and 18b. The independent survey set ups with data capture devices can be mounted to the offshore assets and connected to the network.

The data capture devices can connect directly or be in communication to a local area network on the offshore asset, such as a local area network on a drilling rig which in turn connects to a satellite network.

Global positioning system differential receiver/transmitters 20a and 20b on the offshore asset can communicate to the administrative processor through the network 16, enabling the method to correctly locate the offshore asset.

Client devices 27a and 27b can be connected to or in communication with the network 16. The client devices can each have a processor, data storage and a display 19a and 19b which can show executive dashboards 600a and 600b.

A third party processor 6 can be connected to or in communication with the network 16. The third party processor 6 can communicate with a third party data storage 7, which can contain a library of images 30b, which can be accessed by the administrative processor for use in the method.

FIGS. 2A-2C depicts a diagram the administrative data storage usable in this method.

The administrative data storage 14 can include a customer profile 22 formed by this method.

The customer profile 22 can include a customer name 302, an offshore asset name or code 314, a global positioning system coordinate for the named or coded offshore asset 316, a customer provided origin 318, a quantity of independent survey set ups on the offshore asset 319, an offshore asset local zone system 320, and a library of tagged assets 322.

The library of tagged assets 322 can be formed by this method. The library of tagged assets can be stored in each customer profile according to the method. The library of tagged assets can include for each tagged asset of the plurality of tagged assets 324, such as a tagged asset name. Each tagged asset can have a hyperlink 33 to at least one of the plurality of files or images in a library of images in the administrative data storage or a library of images in the third party data storage connected to the third party processor in communication with the network.

For example, a hyperlink can be www.use.utec.com/libraryofsurveysetups/Shell/bullwinkle.

The administrative data storage can include a library of images 30a containing a plurality of files 31 or images, each file can contain information on the tagged assets in general, such as manufacturer information, and origin of manufacture and can contain an image 32 of the tagged asset.

The administrative data storage can contain the library of survey set ups 400.

The method can include a plurality of computer instructions stored in the administrative data storage to instruct the administrative processor to perform the following various tasks.

The administrative data storage 14 can include computer instructions 200 to create the customer profile and store the customer profile in the administrative data storage.

The administrative data storage 14 can include computer instructions 202 to create an offshore asset local zone system using the customer provided origin and can store the offshore asset local zone system connected to the customer profile in the administrative data storage enabling a customer to view a graphic image, the tagged assets and the independent survey set ups positioned on the offshore asset in the offshore asset local zone system.

In embodiments, the same computer instructions can access and store information on an already created local grid on the offshore asset for use with the method.

The administrative data storage 14 can include computer instructions 206 to identify placement locations of independent survey set ups in a created offshore asset local zone system of the offshore asset or a local grid of the offshore asset enabling each independent survey set up to monitor tagged assets identified from the library of tagged assets.

The administrative data storage 14 can include computer instructions 214 to present multiple independent survey set ups simultaneously on the executive dashboard and display multiple tagged assets of the offshore asset on the executive dashboard simultaneously.

The administrative data storage 14 can include computer instructions 216 to zoom in and zoom out on an image from one of the independent survey set ups on the executive dashboard when a zoom in button or a zoom out button is actuated.

The administrative data storage 14 can include computer instructions 217 to move through the image from one of the independent survey set ups on the executive dashboard in 360 degrees around an axis of the local coordinate network of assets or the local grid when a rotate button is actuated.

The administrative data storage 14 can include computer instructions 218 to move through the image from an independent survey set up on the executive dashboard in 360 degrees in a horizontal plane of the local coordinate network of assets or the local grid using a left pan button and a right pan button.

The administrative data storage 14 can include computer instructions 219 to move through the image from an independent survey set up on the executive dashboard in 360 degrees in a vertical plane of the local coordinate network of assets or the local grid using an up button and a down button.

The administrative data storage 14 can include computer instructions 220 for installing show hide icons onto an image from an independent survey set up on the executive dashboard when a show hide button is actuated.

The administrative data storage 14 can include computer instructions 222 to add and delete a tagged asset to the library of tagged assets using a client device using a dialog screen to insert or delete: an asset name, an asset geolocation, and asset specifications, when an add or delete button is actuated.

The administrative data storage 14 can include computer instructions 224 to search for a tagged asset from the library of tagged assets using an asset name or an asset geolocation and present the results of the search on the executive dashboard.

The administrative data storage 14 can include computer instructions 226 to add a compass to images from the library of tagged assets for display on the executive dashboard while depicting the local coordinate network of assets or the local grid, wherein the compass is aligned to a true north relative to the tagged asset on the planet.

The administrative data storage 14 can include computer instructions 228 to present a laser analysis button on the executive dashboard connected to laser analysis software in the administrative data storage.

In an embodiment, the laser analysis button can have an image of a triangle on the button.

The administrative data storage can include laser analysis software 230.

The administrative data storage 14 can include computer instructions 232 to enable a user on a client device to toggle between a full screen and a reduced screen view of a tagged asset, when a full screen/reduced screen toggle button is actuated on the executive dashboard.

The administrative data storage 14 can include computer instructions 236 to enable a user to toggle between a full color image from an independent survey set up, and a monochrome image from an independent survey set up when a color/monochrome toggle button is actuated.

The administrative data storage 14 can include computer instructions 240 that supplies location information from a local coordinate network of assets or a local grid of tagged assets and identify at least one geographically proximate independent survey set up location in the local coordinate network of assets or the local grid when an information button is actuated on the executive dashboard.

The administrative data storage 14 can include computer instructions 244 to display a map of the local coordinate network of assets or the local grid while simultaneously viewing images from the independent survey set up when a tab on the executive dashboard is activated.

The administrative data storage 14 can include computer instructions 245 to create a plan view of all or a portion of the independent survey set ups from the library of survey set ups on the executive dashboard.

The administrative data storage can include computer instructions 246 for indicating a direction of a field of reference relative to a north of the offshore asset on the plan view in the offshore asset local zone system or local grid from an independent survey set up using a field of view reference pointer in the plan view created when a tab is actuated on the executive dashboard.

The administrative data storage 14 can include computer instructions 250 to present the plan view simultaneously with the image from one or more operating independent survey set ups using the executive dashboard.

The administrative data storage 14 can include computer instructions 252 creating a library of survey set ups capturing information from each independent survey set up mounted on or proximate to an offshore asset.

The administrative data storage 14 can include computer instructions 254 forming an executive dashboard for displaying the images and data from the independent survey set ups, and from the libraries and transmitting the executive dashboard to a client device of a customer.

FIG. 3 depicts an embodiment of the customer profile 22 usable with the method which can be stored in the administrative data storage 14.

The customer profile 22 can include: a customer name 302; a customer billing address 304; a survey date 306; a customer user identification 308; a customer password 310; a customer security question and an answer 312; an offshore asset name or code 314; global positioning system coordinates for the named or coded offshore asset 316; a customer provided origin 318; a quantity of independent survey set ups on the offshore asset 319; an offshore asset local zone system 320; and a local grid 335.

The offshore asset local zone system can be created by the method for the offshore asset. The offshore asset local zone system can be created to enable a customer to view as a graphic image, the tagged assets and the independent survey set ups positioned on the offshore asset in the offshore asset local zone system.

In embodiments, the customer profile can include the library of tagged assets 322.

The library of tagged assets can include, in embodiments, a plurality of tagged assets 324, an icon 323 for each tagged assets, and a hyperlink 33 connected to (a) each icon 323 and (b) a library of images 30 in the administrative data storage or (c) a library of images in a third party data storage.

In embodiments, the customer profile can contain asset addresses for each asset named using the global positioning system 326, an asset address for each tagged asset as positioned in the offshore asset local zone system or the local grid 328, an asset elevation above a mean sea level 330, an asset location below a mean sea level 332, and an asset description 333.

In embodiments, the customer profile can include pluralities of libraries of tagged assets if the customer has a plurality of offshore assets, that is, one library for each offshore asset.

FIG. 4 depicts the library of survey set ups 400 in the administrative data storage 14 usable with the method.

The library of survey set ups 400 can include (i) an address of the independent survey set up in the offshore asset local zone system or the local grid 420; (ii) at least one of: a live video feed, a stored video feed, still photos of the tagged asset, and sonar of the tagged asset 422; (iii) laser information on lasers used in independent survey set ups 424; (iv) at least two and possibly three x, y, and z coordinates locating the independent survey set up in the offshore asset local zone system or the local grid 426; (v) sources of power supply for each independent survey set up on the offshore asset 428; (vi) transmission connection descriptions 406, which can have an indication of how the digital transfer of data occurs from the independent survey set ups to the administrative data storage; and (vii) a job project name 430.

The library of survey set ups 400 can include at least one of: (i) equipment specifications on data capture devices used in independent survey set ups 432, such as a camera make and model and camera specifications; (ii) semi-temporary targets identified for establishing the location of the tagged asset in the offshore asset local zone system or the local grid 434; (iii) support device information on equipment used to support the data capture device 436; (iv) a distance the independent survey set up is from the offshore asset 438; (v) independent survey set up identifiers 402; (xii) independent survey set up data capture device codes 404; (xiii), information on a time line of the data capture device 408; (xv) a customer name 302 or customer code; (xvi) an offshore asset name or code 314.

The library of survey set ups can include independent survey set up identifiers 402, such as "C1-45" for a set up on a specific corner of level 3 of a drilling rig.

The library of survey set ups can include independent data capture device codes 404, such as a laser scanner coded as "Leica 6200."

The library of survey set ups can include transmission connection descriptions 406 that indicate how the data capture devices can transmit data to the network. For example, a transmission connection description can be use a "jump drive."

For example, the timeline of the data capture device can be a date stamp indicating a month, day, year, and minutes when data capture starts and ends by the data capture device.

FIG. 5 shows a display of an executive dashboard formed by the method.

The system uses computer instruction in the administrative data storage to instruct the administrative processor to form the executive dashboard 600.

The executive dashboard 600 displays data from (i) each independent survey set up and (ii) the library of survey set ups and may display information from the library of images.

The executive dashboard 600 shows a customer name 302 and an offshore asset name or code 314.

The executive dashboard 600 can be displayed on the client device of the customer, as shown in FIG. 1.

The executive dashboard displays an image 32 of at least one of the plurality of tagged asset 324 and an icon 323 virtually positioned on each of the tagged assets of the plurality of tagged assets 324.

The virtually positioned icon presents a hyperlink to the library of survey set ups for that tagged asset enabling a customer using the executive dashboard 600 to toggle from the image 32 to the library of survey set ups for each tagged asset being monitored by an independent survey set up.

The executive dashboard 600 can have navigation buttons for use on displayed images from the library of tagged assets, for use on a displayed local coordinate network of assets or combinations thereof.

The executive dashboard can present navigation buttons for displaying on images from the library of tagged assets, the local coordinate network of assets or combinations thereof on the executive dashboard as presented on a client device connected to the network.

The executive dashboard, according to the method, allows a customer to move within the presented image of the tagged asset. The executive dashboard 600 can include a zoom in button 300 and a zoom out button 301, a rotate button 307, and show hide button 303.

A laser analysis button 305 showing a triangle can be presented on the executive dashboard to connect to laser analysis software in the administrative data storage.

The executive dashboard can include a full screen/reduced screen toggle button 317, a left pan button 327 and a right pan button 309. The executive dashboard can include an up button 325 and a down button 311. The executive dashboard can include an add and delete button 313 to add or delete a tagged asset to the library of tagged assets using a client device.

The executive dashboard can include a color/monochrome toggle button 329 that allows a user to toggle between a full color image from the local coordinate network of assets, and a monochrome image from the local coordinate network of assets.

The executive dashboard can include an information button 315 that supplies current location information from a local coordinate network of assets or local grid and identifies at least one geographically proximate independent survey set up location in the local coordinate network of assets.

In this embodiment, a compass 321 is displayed that depicts the orientation of the image from the data capture device to a north relative to the offshore asset local zone system.

A tab 612 on the executive dashboard can activate computer instructions to display a map.

A semi-translucent asset tag 331, which can be generated when an add or delete button is actuated, is also shown. The semi-translucent asset tag can be saved to the library of tagged assets.

FIG. 6 shows that the executive dashboard can additionally display placement locations 680 of a plurality of tagged assets 324a-324f on the offshore asset.

A plan view from a perspective of a plurality of independent survey set up data capture devices each having an icon while data from one specific capture device is simultaneously presented on the executive dashboard.

In embodiments, plan views can drop down and be overlaid onto data capture images when the tab 612 is activated.

A pointer 614 can indicate a direction of a field of reference relative to a north of the offshore asset in the offshore asset local zone system.

Figure 7A:
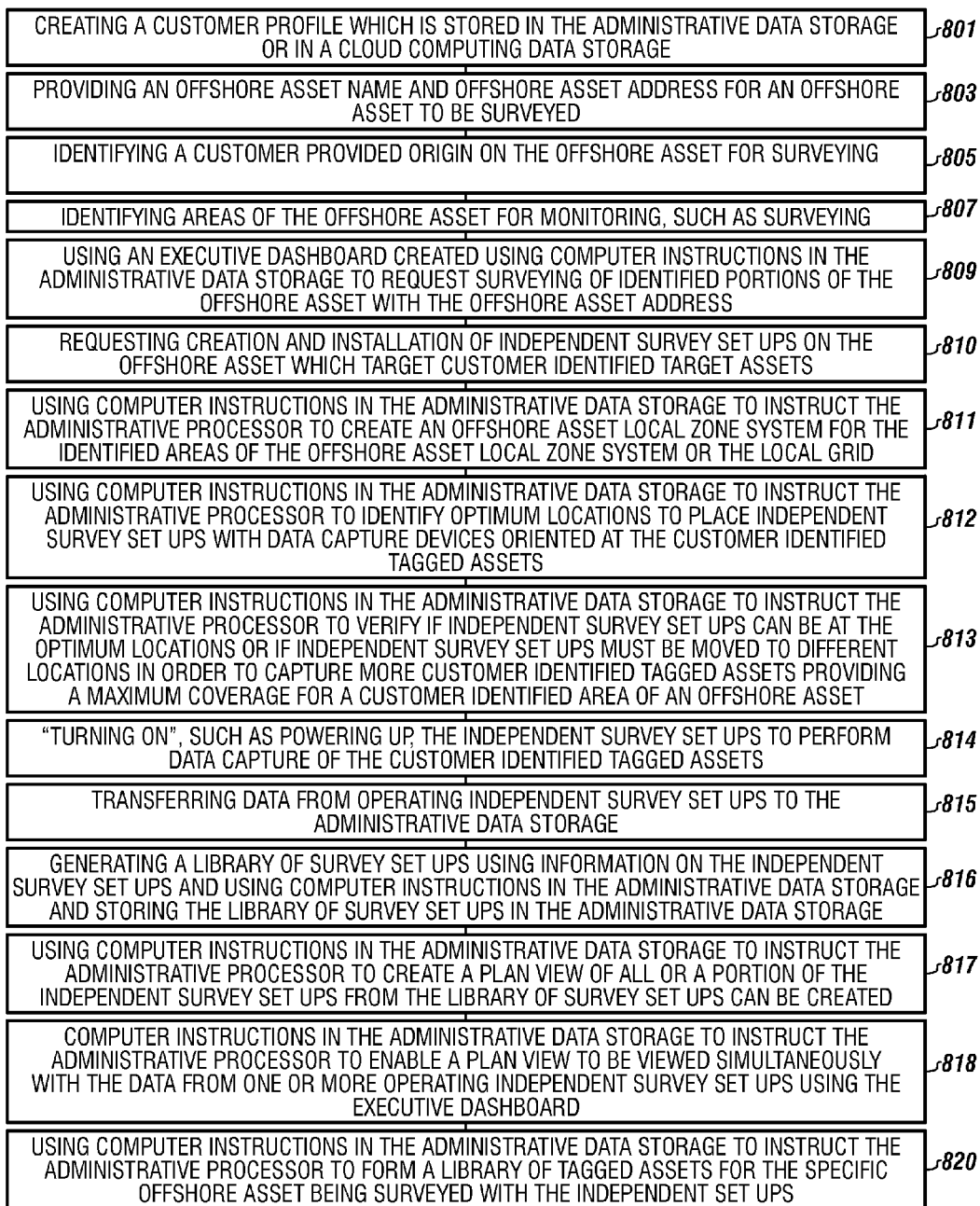

FIGS. 7A-7B depict a sequence of steps to implement the system according to one or more embodiments usable with the method.

In embodiments, steps of the method can be performed by the customer using at least one client device connected to the network and the administrative processor with administrative data storage as described.

The method can include creating a customer profile which is stored in the administrative data storage or in a cloud computing data storage, as shown in step 801.

The customer can create the customer profile as defined herein, using at least one client device connected to the network.

The method can include providing an offshore asset name and offshore asset address for an offshore asset to be surveyed, as shown in step 803.

The method can include identifying a customer provided origin on the offshore asset for surveying, as shown in step 805.

The method can include identifying areas of the offshore asset for monitoring, such as surveying, as shown in step 807.

The method can include using an executive dashboard created using computer instructions in the administrative data storage to request monitoring of identified portions of the offshore asset with the offshore asset address, as shown in step 809.

The method can include requesting creation and installation of independent survey set ups on the offshore asset which target customer identified target assets, as shown in step 810.

The method can include using computer instructions in the administrative data storage to instruct the administrative processor to create an offshore asset local zone system for the identified areas of the offshore asset local zone system or the local grid, as shown in step 811.

The method can include using computer instructions in the administrative data storage to instruct the administrative processor to identify optimum locations to place independent survey set ups with data capture devices oriented at the customer identified tagged assets, as shown in step 812.

The method can include using computer instructions in the administrative data storage to instruct the administrative processor to verify if independent survey set ups are at the optimum locations or if independent survey set ups must be moved to different locations in order to capture more customer identified tagged assets providing a maximum coverage for a customer identified area of an offshore asset, as shown in step 813.

The method can include "turning on", such as powering up, the independent survey set ups to perform data capture of the customer identified tagged assets, as shown in step 814.

The method can include transferring data from operating independent survey set ups to the administrative data storage, as shown in step 815.

The method can include generating a library of survey set ups using information on the independent survey set ups and using computer instructions in the administrative data storage and storing the library of survey set ups in the administrative data storage, as shown in step 816.

The method can include using computer instructions in the administrative data storage to instruct the administrative processor to create a plan view of all or a portion of the independent survey set ups from the library of survey set ups can be created, as shown in step 817.

The method can include using computer instructions in the administrative data storage to instruct the administrative processor to enable a plan view to be viewed simultaneously with the data from one or more operating independent survey set ups using the executive dashboard, as shown in step 818.

The method can include using computer instructions in the administrative data storage to instruct the administrative processor to form a library of tagged assets for the specific offshore asset being surveyed with the independent set ups, as shown in step 820.

The method can include creating an icon connected to the library of tagged assets and installing the icon virtually over the image of the tagged asset generated from the data capture device, which can also include creating a hyperlink for the icon to the library of images and the customer profile in the administrative data storage, as shown in step 821.

In embodiments, creation of the icon includes creating a hyperlink for the icon to the library of images and the customer profile in the administrative data storage. In embodiments, the library of images can be in the third party data storage.

By linking the library of tagged assets to the library of survey set ups, the tagged assets can be monitored simultaneously with a plan view map using locations indicated in the offshore asset local zone system displayed on the executive dashboard.

The customer can now make decisions in real time on repair, maintenance, safety, and asset inventory control with this system, using at least one of the client devices of the customer, all of which can be remote from the offshore asset, or using at least one of the client devices that is on or adjacent to the offshore asset.

The method can include using computer instructions and the executive dashboard to access and view related data of the offshore asset such as tagged asset specification data, while viewing the data capture images and the plan view simultaneously from a plurality of client devices of the customer, simultaneously, as shown in step 824.

By means of the method for monitoring a plurality of tagged assets, the client device can tour any offshore asset with real time visualisation, accurate real world on screen measurements, using laser analysis software, and view/download all deliverables such as drawings, 3D models, photos and reports through a library of images. All information can be derived from the latest data capture devices, allowing real time monitoring from remote locations by one or more users, providing ultimate confidence. A library of tagged assets can be incorporated into the ISITE™ system created by UTEC Survey, Inc. of Houston, Tex., intelligently linking, via a world area network, private network, third party cloud network, or any various combinations thereof.

Visualisation tools designed to revolutionize and consolidate asset management operations which are proven to increase productivity and reduce operational expenditures, while minimising accidents, environmental harm and injuries by visualising and identifying hazards in advance of work being carried out on the offshore asset.

In another embodiment, the method of monitoring a plurality of tagged assets on at least one of a plurality of offshore assets involves creating a customer profile using a client device connected to a network and storing the customer profile in an administrative data storage connected to an administrative processor connected to the network.

In this second embodiment of the method, at least one offshore asset is identified in the customer profile.

Next, a customer provided origin is inserted into the customer profile for each offshore asset in the customer profile.

The customer profile as well as, global positioning system coordinates for each offshore asset and in some cases, each tagged asset on the offshore asset are inserted in the customer profile.

The method continues by creating an offshore asset local zone system using the customer provided origin; and storing the offshore asset local zone system connected to the customer profile in the administrative data storage. In some embodiment, the method uses a local grid already created by the customer on the offshore asset.

The method continues by installing a plurality of independent survey set ups connected to the network on the offshore asset.

Each independent survey set up is directed to a tagged asset identified in the offshore asset local zone system.

Each independent survey set up uses at least one data capture devices for monitoring at least one tagged asset; such as a video camera, a laser, an infra camera, a sonar emitting device, a still camera, or any variations of combinations thereof.

The method continues by forming a library of tagged assets for each offshore asset being monitored with independent survey set ups.

The method stores each library of tagged assets in the customer profile.

Each library of tagged assets can contain a plurality of tagged assets, with each of the plurality of tagged assets having a hyperlink to (i) a library of images in the administrative data storage having at least one image, or to (ii) a library of images having at least one image, in a third party data storage connected to the network.

Each library of images can have a plurality of files of tagged assets on the offshore asset.

The method continues by using the offshore asset local zone system to identify placement locations of independent survey set ups in the created offshore asset local zone system of the offshore asset or in the local grid of the offshore asset to monitor specific targets identified from the library of tagged assets; and display the placement locations on an executive dashboard.

The method creates the executive dashboard and transmits the executive dashboard via the network to a display of a client device connected to the network.

In embodiments of the method, the library of survey set ups can contain a plurality of independent survey set ups mounted on or proximate to the offshore asset.

The executive dashboard created by the method cannot only display images from the independent survey set ups; simultaneously but also display the client profile information and the plurality of tagged assets simultaneously.

While these embodiments have been described with emphasis on the embodiments, it should be understood that within the scope of the appended claims, the embodiments might be practiced other than as specifically described herein.

What is claimed is:

1. A method for forming an executive dashboard on a client device, using non-transitory computer readable instructions from an administrative processor for monitoring a plurality of tagged assets on at least one of a plurality of offshore assets the method comprising the steps of:

creating, by a client device, a customer profile identifying at least one of the plurality of offshore assets in an administrative data storage connected to an administrative processor connected to a network;

receiving, by an administrative processor, data from an independent survey set up consisting of a survey set up processor, a survey set up data storage, and a camera having at least one of a laser survey instrument, a portable laser scanner and sonar device;

creating, by an administrative processor, a dynamic library of survey set ups and storing data from at least one independent survey set up mounted on or proximate to the at least one of the plurality of offshore assets on the administrative data storage;

creating, by an administrative processor, a dynamic library of tagged assets for the least one of the plurality of offshore assets using the at least one independent survey set up;

creating, by an administrative processor, hyperlinks for each of the tagged assets in wherein the dynamic library of tagged assets comprises the plurality of tagged assets, wherein each of the plurality of tagged assets has an icon with a hyperlink to a dynamic library of images stored on the administrative data storage;

identifying, by at least one independent survey set up, placement locations from the at least one independent survey set up for a created offshore asset local zone system of the offshore asset or a local grid of the offshore asset and storing on the administrative data storage, enabling the at least one independent survey set up to monitor the plurality of tagged assets identified from the dynamic library of tagged assets;

transmitting, by an administrative processor instructions to form an executive dashboard, to the at least one client device, the executive dashboard is formed from data received from (i) the at least one independent survey set up and (ii) the dynamic library of survey set ups and displays a customer name or an offshore asset name or code; and executing, by the client device, instructions received from an administrative processor, the executive dashboard displaying dynamic images from the dynamic library of images of the plurality of tagged assets and a virtually positioned icon on each of the plurality of tagged assets, the virtually positioned icon presents a hyperlink to the dynamic library of survey set ups for a particular tagged asset, thereby enabling toggling from the image to the dynamic library of survey set ups for each of the plurality tagged assets being monitored by the at least one independent survey set up.

2. The method of claim 1, further comprising creating the offshore asset local zone system using the customer provided origin and storing the offshore asset local zone system connected to the customer profile in the administrative data storage, thereby enabling a customer to view as a graphic image, each of the plurality of tagged assets and the at least one independent survey set up positioned on the offshore asset in the offshore asset local zone system.

3. The method of claim 1, further comprising a third party data storage with a library of images.

4. The method of claim 1, further comprising the step of presenting multiple independent survey set ups simultaneously on the executive dashboard and displaying multiple tagged assets of the offshore asset on the executive dashboard simultaneously.

5. The method of claim 1, further comprising the step of zooming in and zooming out on data from the at least one independent survey set up on the executive dashboard when a zoom button is actuated.

6. The method of claim 1, further comprising the step of moving through the captured data from the at least one independent survey set up on the executive dashboard in degrees around an axis when a rotate button is actuated.

7. The method of claim 1, further comprising the step of moving through the captured data from the at least one independent survey set up on the executive dashboard in degrees in a horizontal plane using a left pan button and a right pan button.

8. The method of claim 1, further comprising the step of moving through the captured data from the at least one independent survey set up on the executive dashboard in degrees in a vertical plane of a local coordinate network of assets using an up button and a down button.

9. The method of claim 1, further comprising the step of installing show hide icons onto the captured data from the at least one independent survey set up on the executive dashboard when a show hide button is actuated.

10. The method of claim 1, further comprising the step of searching for a tagged asset from the dynamic library of tagged assets using an asset name or an asset geolocation.

11. The method of claim 1, further comprising the step of adding a compass to images from the dynamic library of tagged assets and/or a local coordinate network of assets, wherein the compass is aligned to a true north relative to the tagged asset on the planet.

12. The method of claim 1, further comprising the step of presenting a laser analysis button connected to a laser analysis software in the administrative data storage.

13. The method of claim 1, further comprising the step of enabling a user on the at least one client device to toggle between a full screen and a reduced screen view of the tagged asset from a local coordinate network of assets when a full screen/reduced screen toggle button is actuated on the executive dashboard.

14. The method of claim 1, further comprising the step of enabling a user to toggle between a full color image from a local coordinate network of assets and a monochrome image from the local coordinate network of assets when a color/monochrome toggle button is actuated.

15. The method of claim 1, further comprising the step of supplying current location information from a local coordinate network of assets and identifies at least one geographically proximate independent survey set up location in the local coordinate network of assets when an information button is actuated.

16. The method of claim 1, further comprising the step of displaying a map of a local coordinate network of assets while simultaneously viewing captured data from the data capture device of the at least one independent survey set up when a tab on the executive dashboard is activated.

17. The method of claim 1, further comprising the step of creating a plan view of all or a portion of the at least one independent survey set up from the dynamic library of survey set ups stored on the administrative data storage.

18. The method of claim 17, further comprising the step of indicating a direction of a field of reference relative to north of the offshore asset on the plan view in the offshore asset local zone system from the at least one independent survey set up using a field of view reference pointer.

19. The method of claim 18, further comprising the step of presenting the plan view simultaneously with the captured data from the at least one independent survey set up using the executive dashboard.

20. The method of claim 1, wherein the data storage is a non-transitory computer readable medium selected from the group comprising a hard disk drive, a solid state drive, a flash drive, and a tape drive.

* * * * *